US008107105B2

(12) United States Patent
Sakai

(10) Patent No.: US 8,107,105 B2

(45) Date of Patent: Jan. 31, 2012

(54) IMAGE FORMING APPARATUS

(75) Inventor: Takaaki Sakai, Hachioji (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 550 days.

(21) Appl. No.: 12/260,237

(22) Filed: Oct. 29, 2008

(65) Prior Publication Data

US 2009/0122327 A1 May 14, 2009

(30) Foreign Application Priority Data

Nov. 9, 2007 (JP) ................................ 2007-292002

(51) Int. Cl.
*G06K 15/00* (2006.01)
*H04N 1/60* (2006.01)

(52) U.S. Cl. ........................ 358/1.14; 358/1.16; 358/1.9

(58) Field of Classification Search ................. 358/1.14, 358/1.9, 3.1; 386/117; 347/131, 140, 240, 347/237, 238
See application file for complete search history.

(56) References Cited

U.S. PATENT DOCUMENTS 4,243,313 A 1/1981 Masuda et al.
5,832,331 A 11/1998 Yoshida et al.
7,822,321 B2 * 10/2010 Watanabe et al. ............. 386/224

FOREIGN PATENT DOCUMENTS

JP 2003-039790 2/2003
JP 2004-318432 A 11/2004
JP 2005-022099 A 1/2005

OTHER PUBLICATIONS

Office Action in JP 2007-292002 dated Jun. 30, 2009, and an English Translation thereof.
European Search Report in Application No. 08167831.0-2209 dated Apr. 1, 2009.

* cited by examiner

*Primary Examiner* — Charlotte M Baker
(74) *Attorney, Agent, or Firm* — Buchanan Ingersoll & Rooney PC

(57) ABSTRACT

An image forming apparatus including:
a generation section which generates time stamp data,
an image forming section which forms an image on a sheet based on a synthetic image data which is synthesized of the time stamp data generated by the generation section and an image data of a job,
a nonvolatile memory,
an electric power switch for turning on and off a power supply, and
a control section which controls execution of the job,
wherein, in a case where the control section detects that the electric power switch is turned off while executing the job, the control section interrupts the execution of the job, memorizes the interrupted job including interrupted image data and time stamp data which were to be synthesized with the interrupted image data in the nonvolatile memory, and turns off the power supply.

4 Claims, 12 Drawing Sheets

IMAGE FORMING APPARATUS

RELATED APPLICATION

This application claims priority to Japanese Patent Application No. 2007-292002 filed on Nov. 9, 2007 and all the contents of the application shall be incorporated here by reference.

TECHNICAL FIELD

The present invention relates to an image forming apparatus which forms an image on a sheet.

BACKGROUND

General image forming apparatuses, which have become popularized now, are equipped with a function which makes it possible to resume an interrupted job appropriately after restoration, although it is a case where events for interruption arise during execution of a job.

Various cases can be considered to events for interruption. For example, there may be a case where a job is interrupted due to the empty of paper and/or paper jam (jam), and the other case where a user turns off power to continue the job, which the user intends to executing on the next day, at the time of the end of operation of the day. In the case where such events for interruption arise, the following technology is disclosed as an image forming apparatus, which can resume an uncompleted job appropriately.

According to Japanese Patent Application Publication No. 2005-22099 discloses an image forming apparatus, which allows nonvolatile memory, such as a hard disk to memorize job management information at the time of the end of each job, or predetermined time lapse. Job management information here is information, which controls a storage area of image data memorized on the nonvolatile memory for every job.

In the case that it is an image forming apparatus disclosed in Japanese Patent Application Publication No. 2005-22099, although a case arises that it may be interrupted during execution of a job and the power may be turned off, job management information can be read from the nonvolatile memory after restoration.

Therefore, based on read job management information, an uncompleted job can be executed appropriately.

According to Japanese Patent Application Publication No. 2004-318432, technology for allowing a movable terminal to obtain interruption information at the time of job interruption, memorize it and transmit this to other image forming apparatus in order to execute the uncompleted job with the other image forming apparatus. Interruption information here is formed by information including setting of the density of image formation and information pertaining to the finishing number of pages on which image has been formed.

According to Japanese Patent Application Publication No. 2004-318432, although it takes time from when the job was interrupted to the time when the job is restored, an uncompleted job can be quickly processed with other image forming apparatus.

However, according to the image forming apparatus disclosed in Japanese Patent Application Publication No. 2005-22099 and 2004-318432, in the case where setting information for synthesizing the time stamp data, which indicates the present date or time (henceforth "time and day"), is shown in the image data of the interrupted job, a problem arises. For example, it is a case where after a job is interrupted, the job is restored or resumed on the following day.

In the above-mentioned case, in one job, time stamp data in which the dates differ before and after the interruption, will be synthesized into image data, and image formation of this synthesized synthetic image data will be performed. Although it is a case where the job is restored on the same day, time stamp data having different times will be synthesized into the image data.

A user usually expects synthesizing the same time stamp data to the image data of one job. In the case where the time stamp data synthesized when a job restarts after restoration differs from the one before interruption, in order to synthesize the same time stamp data, the job before the interruption must be executed after the job restoration.

Even though, after the restoration, the resumption of the job, which is not completed, is possible, an improvement of printing efficiency cannot be promoted and cannot prevent occurrence of printing sheet loss either.

An object of the present invention is to provide image data of one job with image forming apparatus, which is capable of providing the same forming time stamp data for image data of one job.

SUMMARY OF THE INVENTION

The aspects of the present invention are any one of the image forming apparatus described as follows.

(1) An image forming apparatus including:

a generation section which generates time stamp data, an image forming section which forms an image on a sheet based on a synthetic image data which is synthesized of the time stamp data generated by the generation section and an image data of a job, a nonvolatile memory, an electric power switch for turning on and off a power supply, and a control section which controls execution of the job, wherein, in a case where the control section detects that the electric power switch is turned off while executing the job, the control section interrupts the execution of the job, memorizes the interrupted job including interrupted image data and time stamp data which were to be synthesized with the interrupted image data in the nonvolatile memory, and turns off the power supply.

(2) An image forming apparatus comprising:

a generation section which generates time stamp data, an image forming section which forms an image on a sheet based on a synthetic image data which is synthesized of the time stamp data generated by the generation section and an image data of a job, a nonvolatile memory, an electric power switch for turning on and off a power supply, and a control section which controls execution of the job, wherein, in a case where the control section detects that the electric power switch is turned off while executing the job, the control section interrupts the execution of the job, synthesizes the synthetic image data from interrupted image data and present time stamp data, forms interrupted job of which the interrupted image data is changed to the synthetic image data, memorizes the interrupted job including the synthetic image data to the nonvolatile memory, and turns off the power supply.

DESCRIPTION OF THE PREFERRED EMBODIMENT

The First Embodiment

Hereafter, the optimum structure and operations of an image forming apparatus in a first embodiment will be described in detail using a drawing. A first embodiment explains the example which allows nonvolatile memory to memorize time stamp data at the time of job interruption.

Figure 1:
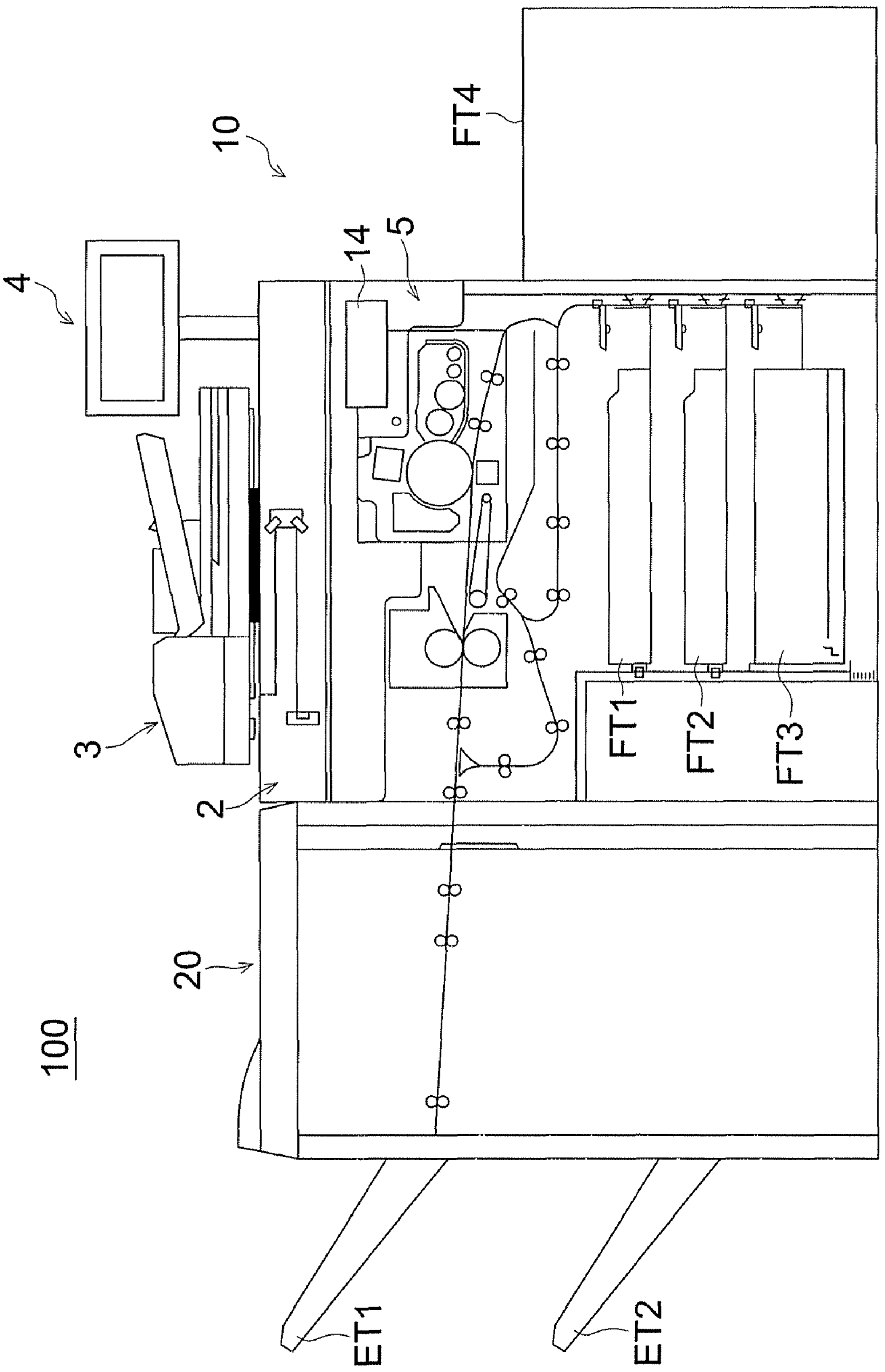
FIG. 1 illustrates a drawing showing an example of the outline structure of an image forming apparatus.

First, the schematic diagram of image forming apparatus 100 in this embodiment will be shown in FIG. 1. Image forming apparatus 100 is configured by main body section 10 and finishing section 20, which has been optionally connected.

Main body section 10 is provided with scanner section 2, automatic document feeder (ADF: Automatic Document Feeder) 3, operation display section 4 and image forming section 5. That is, image forming apparatus 100 related to this embodiment is what is called a digital multi-function machine provided with a scanner function, a copy function and a printer function.

Three paper feed trays FT 1-FT 3, which have a sheet feeding mechanism and large capacity tray unit FT 4, are provided in main body section 10. Near each paper feed trays FT 1-FT 4, the feed sensor, which detects fed paper sheet is provided. The paper sheet in which the type and size of a regular paper sheet, such as, a scratch paper, a recycled paper sheet, a paper sheet of fine quality, a tab paper sheet, differ from each other, respectively can be accommodated in these paper feed trays FT 1-FT 4.

Finishing section 20 is what is called a finisher that performs various post-processing in the sheet conveyed from main body section 10. For example, finishing section 20 is provided with a punch unit which performs punch processing of a sheet conveyed from main body section 10, a sorting unit which performs sorting processing, a fold unit which performs a folding processing, a decision unit which performs decision processing, and a cutting unit which performs cutting processing. Sheet ejection tray ET1 to which the conveyed sheet is delivered, and ET2 are provided in finishing section 20.

In image forming apparatus 100, the original document placed in the document tray of ADF section 3 is conveyed to the contact glass, which is a reading place of scanner section 2, and analog image data is read by the optical system of scanner section 2. Analog image data contains not only image data, such as a figure and a photograph, but also text data, such as a character and a sign.

The analog image data read by scanner section 2 is outputted to image control section 1 described later, and an A/D conversion is performed in image control section 1. The digital image data (only henceforth "image data") to which the A/D conversion has been performed is outputted to image forming section 5, after being stored in the storage area in nonvolatile memory 14 or after various image processing have been applied.

And in image forming section 5, image formation of the image data is performed onto the sheet, which was fed from any one of paper feed trays FT 1-FT 4. The sheet on which image formation has been performed is conveyed to finishing section 20 by a delivery mechanism. After predetermined post-processing is performed, the paper sheet is ejected to any one of sheet ejection tray ET1 or ET2.

Figure 2:
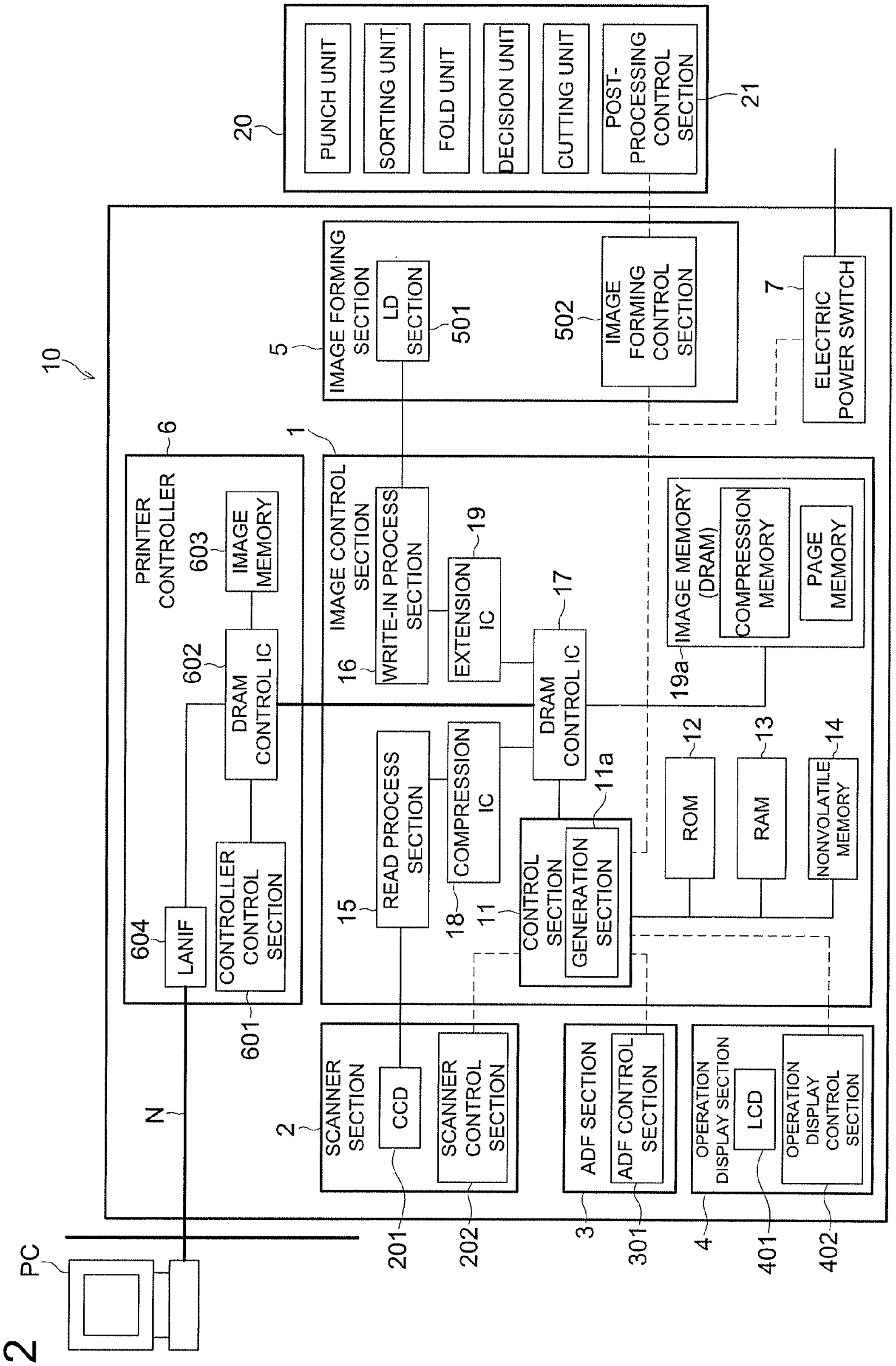
FIG. 2 illustrates a functional block diagram of the image forming apparatus.

FIG. 2 illustrates a block diagram showing the functional structure of image forming apparatus 100. Main body section 10 is provided with image control section 1, scanner section 2, ADF section 3, operation display section 4, image forming section 5, printer controller 6 and electric power switch 7, and is configured thereby.

Image control section 1 is provided with control section 11, ROM (Read Only) Memory 12, RAM (Random Access Memory) 13, nonvolatile memory 14, read process section 15, write-in process section 16, DRAM (Dynamic Random Access Memory) control IC 17, compression IC 18, extension IC 19 and image memory 19*a*, and configured thereby.

Various processing programs memorized in ROM 12, such as a system program, an image forming process program and a sheet ejection processing program are read. It is expanded into RAM 13, and control section 11 controls operation of each part of image forming apparatus 100 according to the expanded program.

Control section 11 allows nonvolatile memory 14 to memorize the various setting information, which describes later, (henceforth "job setting information") related to the job inputted via operation display section 4 or image memory 19*a* temporarily. Job setting information may be inputted from external information terminal PC via communication network N.

A job here is a unit, which defines work until a series of image formation ends from the start as one job. Job setting information is setting information including the image formation conditions, which are set up per one job. For example, there is setting information (henceforth "the setting information on synthetic image data"), which synthesizes time stamp data into image data.

Control section 11 reads job setting information memorized at the time of job execution, and executes image forming process to image data inputted from scanner section 2 based on read job setting information.

Control section 11 is provided with generation section 11*a*, which generates and memorizes system clock data. The system clock data is information, which shows the present time. In the case where setting information on synthetic image data is included in job setting information, system clock data is usually used as time stamp data.

ROM12 is configured by nonvolatile memory, such as semiconductor memory, and memorizes a system program corresponding to image forming apparatus 100, various processing programs such as an image forming process program, which can be executed on this system program and a sheet ejection processing program. These programs are stored with a configuration of a program code, which can be read by the computer, and control section 11 executes operation according to this program code one by one.

RAM 13 forms a work area, which memorizes temporarily data related to various programs executed by control section 11 and these programs, and memorizes information on various setup of operation.

RAM 13 memorizes job setting information temporarily. This job setting information may be memorized in image memory 19*a*.

Nonvolatile memory 14 is configured by nonvolatile memory, which is capable of keeping memory of information without having supply of power. Nonvolatile memory 14 memorizes interrupted job. Interrupted job memorizes image data of job setting information on an interrupted job and the image data of a job as information. In the case where setting information in the synthetic image data is included in job setting information, the present time stamp data is memorized as information of the interrupted job. Or job setting information synthetic image data, which synthesized time stamp data and image data is memorized as information of the interrupted job.

Read process section 15 generates image data in which analog image data inputted from scanner section 2 to which, various kinds of processing, such as, analog signal processing, A/D conversion processing, shading processing have been applied, and outputs it to compression IC 18.

Write-in process section 16 generates a PWM (Pulse Width Modulation) signal based on image data inputted from extension IC 19, and outputs it to image forming section 5.

DRAM control IC 17 performs input-and-output control of image data in image memory 19*a* while controlling compression processing of image data by compression IC 18, and extension processing of compressed data by extension IC 19 under the control of control section 11.

When the memory of image data read by scanner section 2 is instructed, DRAM control IC 17 allows compression IC 18 to execute compression processing of the image data inputted from read process section 15, and allows the compression memory of image memory 19*a* to memorize the compressed image data.

When image formation of compressed image data memorized in the compression memory is instructed, the compressed image data is read from the compression memory, extension processing is executed by extension IC 19 and the image data is memorized in a page memory. Image data, which has been memorized in the page memory is read and outputted to write-in process section 16.

Compression IC 18 performs compression processing of inputted image data by the control of DRAM control IC 17. Extension IC 19 performs extension processing to inputted compressed image data by the control of DRAM control IC 17.

Image memory 19*a* includes a DRAM (Dynamic Random Access Memory), which is volatile memory, and has a compression memory and a page memory.

A compression memory is a memory for memorizing compressed image data, and a page memory is a memory for storing temporarily image data to be compressed to which image formation is going to be applied before image formation. Image memory 19*a* memorizes job setting information temporarily. This job setting information may be memorized to RAM 13.

Scanner section 2 is provided with image sensors 201, such as CCD and scanner control section 202, and is configured thereby.

Scanner control section 202 performs drive control of each section of scanner section 2 based on a control signal from control section 11. Concretely, scanner control section 202 executes exposure scan of a document surface placed on the contact glass, performs image formation of the reflected light on CCD 201 and reads the image. And by performing photoelectric conversion of this light signal by which image formation was performed, analog image data is generated, and it is outputted to read process section 15.

ADF section 3 is provided with ADF control section 301, which controls ADF section 3 based on the control signal from control section 11, and performs automatic feeding of every one document placed on the document tray (not shown) on the contact glass of scanner section 2.

Operation display section 4 is provided with LCD (Liquid Crystal Display) 401, operation display control section 402 and the operation key group that is not illustrated in addition to this, and is configured thereby.

LCD 401 displays a status display of various setting screens or images, the status of each function of operation on a screen according to the display control signal from operation display control section 402.

On screen of LCD 401, the pressure-sensitive-type (resistance film pressure type) touch panel on which a transparent electrode has arranged in the shape of a lattice is configured. The touch panel detects the XY coordinates of the force point operated by fingers and a touch pen (stylus) with a voltage value and outputs the detected position signal to operation display control section 402 as a operation signal.

Operation display control section 402 performs display control in LCD401 based on the control signal from control section 11. For example, the basic screen for inputting image formation conditions and various processing results are displayed on LCD 401. Operation display control section 402 outputs an operation signal inputted from the touch panel on the operation key group or LCD 401 to control section 11.

Image forming section 5 is provided with LD (Laser Diode) section 501 and image forming control part 502, and is configured thereby. Image forming section 5 forms an image on the sheet based on the image data inputted from write-in process section 16.

LD section 501 is provided with LD, a photosensitive drum, a electrostatic charging section, an exposure section, a developing section, a transfer section, a cleaning section and a fixing section. Further, LD section 501 has various rollers including a feed roller for conveying the sheet according to a conveying path in LD section 501, a registration roller, an ejection roller, a conveyance path change board and a reversal section.

The conveyance section of LD section 501 feeds the sheet specified by the job based on the control from image forming control section 502 from any one of paper feed trays FT 1-FT 4. A conveyance section of LD section 501 conveys the fed sheet on the conveying path.

A plurality of sensors are provided on the conveying path of LD section 501. These sensors generate detection signals when a sheet passes, and they are outputted to image forming control section 502.

Image forming control section 502 receives the control signal from control section 11, and controls operation of each section of LD section 501. Image forming control section 502 counts number of sheets of the sheet which was fed for each job based on the detection signals from sensors provided on the conveying path, and outputs them to control section 11. Image forming control section 502 relays data communications between control section 11 and post-processing control section 21.

In image forming section 5, the photosensitive drum surface is electrified by the electrostatic charging section based on directions from image forming control section 502. And based on the PWM signal inputted from write-in process section 16, the photosensitive drum surface is irradiated with the laser beam from LD section 501, and an electrostatic latent image is formed. Next, a toner is made to adhere onto the area, which contains an electrostatic latent image, onto the surface of the photosensitive drum in the developing section, toner is transferred onto the sheet by the transfer section, and an image is formed. After fixing the transferred image in the fixing section, the sheet onto which an image has been formed is conveyed to finishing section 20 by ejection rollers.

Printer controller 6 is provided with controller control section 601 and DRAM control IC 602, image memory 603, and LANIF 604 and is configured thereby.

Controller control section 601 totally controls operation of each section, and distributes data inputted from external information terminal PC to image control section 1 via LANIF 604 as a job.

DRAM control IC 602 controls storing data received by LANIF 604 into image memory 603 and reading-out of data from image memory 603. DRAM control IC 602 is connected with DRAM control IC 17 of image control section 1 via PCI (Peripheral Components Interconnect) bus. According to the directions from controller control section 601, DRAM control IC602 reads data for image formation from image memory 603 and outputs them to DRAM control IC 17.

Image memory 603 is configured by a DRAM and stores inputted data temporarily. LANIF 604 is a communication interface for connecting the image forming apparatus with networks, such as a NIC (Network Interface Card) and a modem, receiving data via a network from information terminal PC and outputting it to DRAM control IC602.

Electric power switch 7 switches ON and OFF of a sub-power supply and ON and OFF of the main power supply by a switch, and outputs an ON-and-OFF signal to control section 11.

In the state where the power is supplied, RAM 13 and image memory 19*a* can memorize information, and in the state where power supply is stopped, memorized information is extinguished. On the other hand, nonvolatile memory 14 can keep memory of the information also in the state where a power is not supplied.

Finishing section 20 is provided with post-processing control section 21, which controls each section of finishing section 20 based on the control signal inputted from control section 11 via image forming control section 502.

Post-processing control section 21 is configured by a CPU which is not illustrated, a program memory (ROM), which memorizes a system program corresponding to finishing section 20 and various processing programs which can be executed on the system program, and system memory (RAM).

The CPU of post-processing control section 21 performs drive control of each section by collaboration with the program memorized in the ROM based on an inputted control signal, and performs punch processing, sorting processing, folding process, decision processing and cutting processing, for example. The sheet which was ejected from image forming section 5 is delivered to predetermined sheet ejection tray ET1 or ET2.

Next, processing operation of image forming apparatus 100 in this embodiment will be described. In processing which will be described below, control section 11 carries out operations by collaborating with various kinds of programs memorized in ROM 12.

Figure 3:
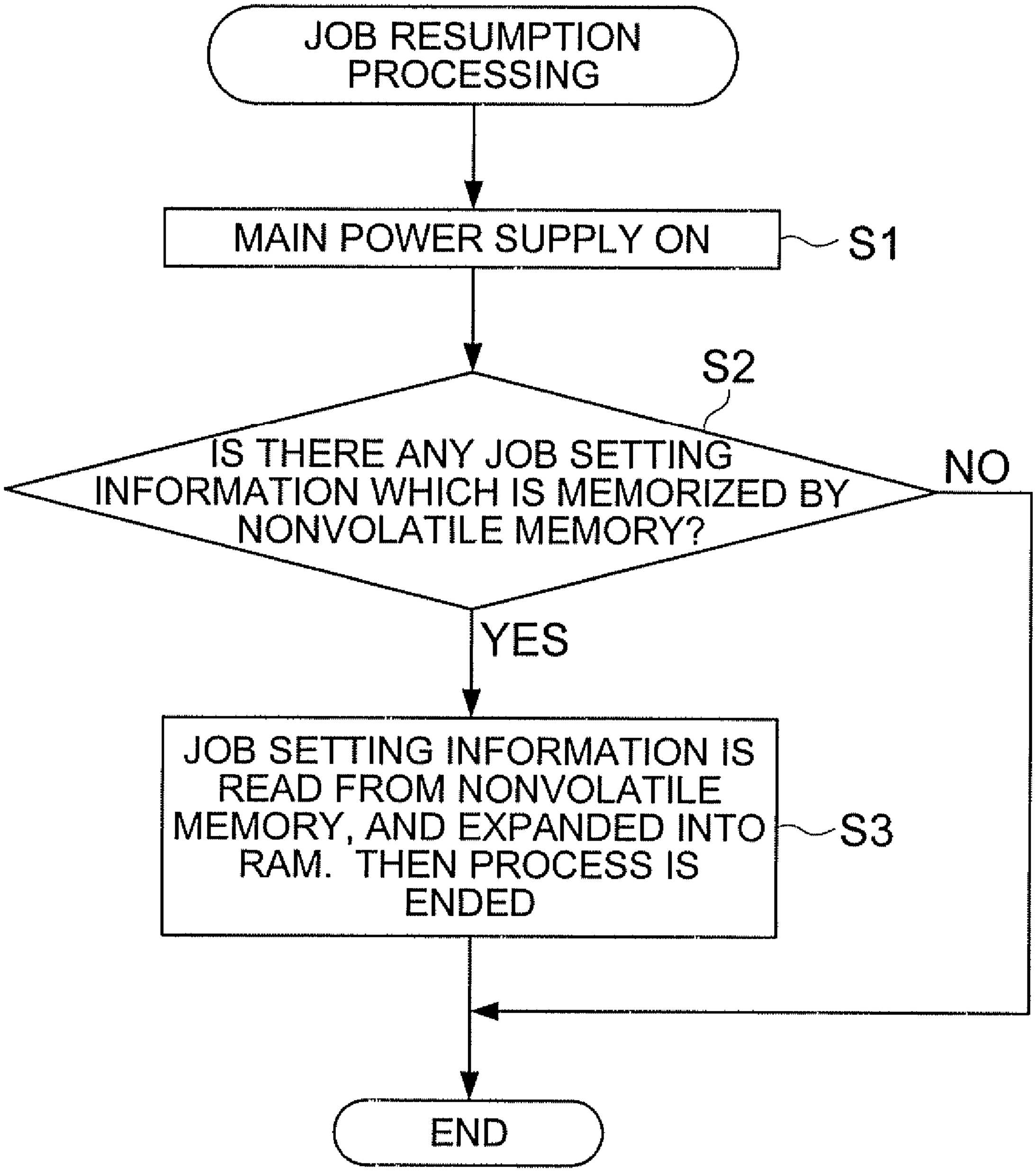
FIG. 3 illustrates a flow chart explaining job resumption processing.

First, resumption processing of a job will be described with reference to FIG. 3. As a premise of the processing shown in FIG. 3, when a certain event for interruption arose, a job under execution should have been interrupted temporarily and electric power switch 7 of the main power supply should have been turned OFF. And the processing explains below is processing that the control section 11 performs when restoring afterward.

When a main power supply of image forming apparatus 100 is turned on by a user, control section 11 detects power supply on, and allows each section of image forming apparatus 100 to supply power (STEP S1).

Control section 11 determines whether there is any job setting information memorized in nonvolatile memory 14 in advance (STEP S2).

Figure 4:
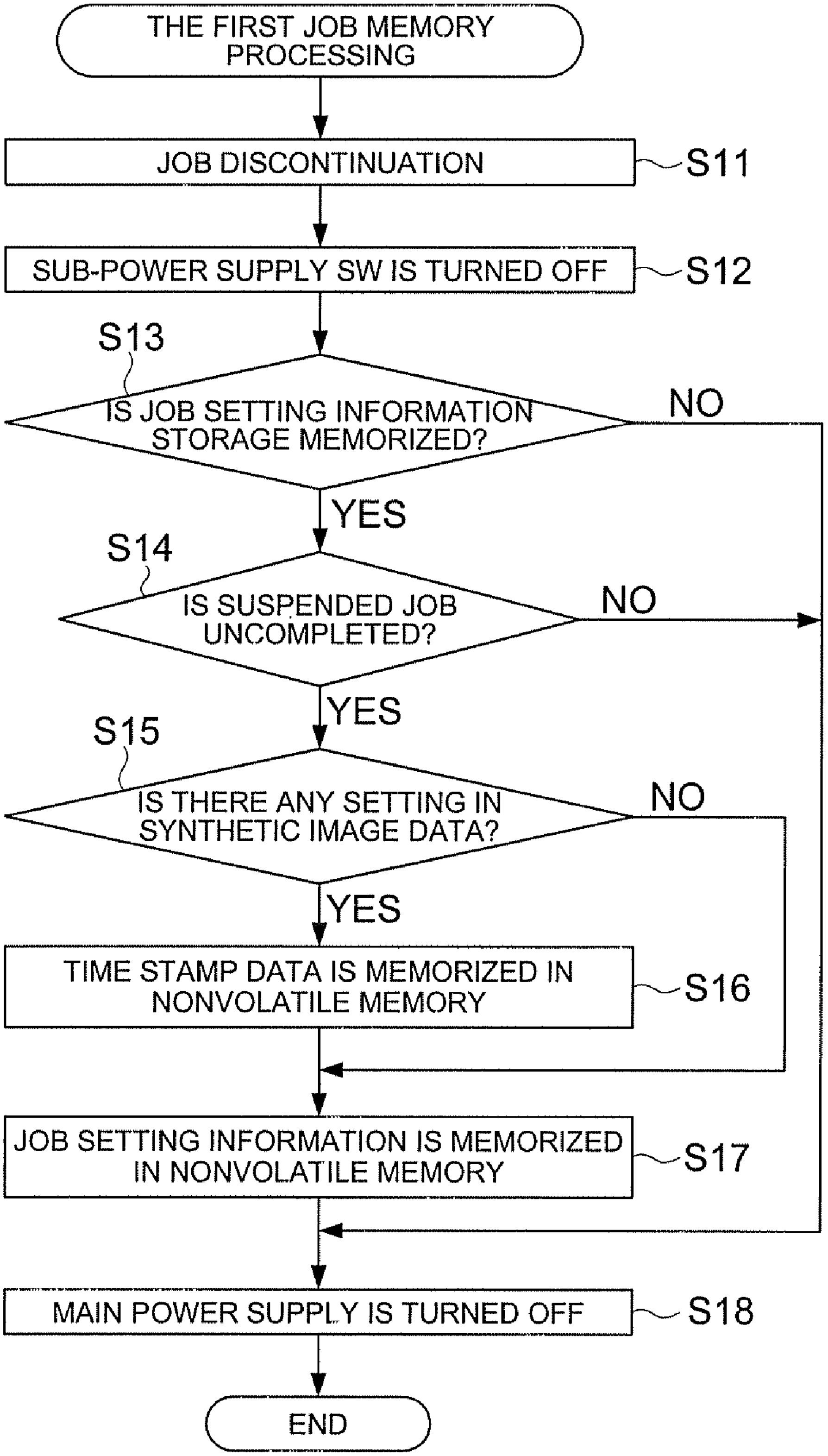
FIG. 4 illustrates a flow chart explaining the first job memory processing.

The process by which control section 11 memorizes job setting information into nonvolatile memory 14, will be described in FIG. 4 described later.

In the case where there is no job setting information memorized in nonvolatile memory 14 (STEP S2; NO), control section 11 determines there is no job to resume, and ends this processing. After this, control section 11 will be in a waiting state until control section 11 receives execution directions of the job from operation display section 4.

On the other hand, in the case where there is job setting information memorized in nonvolatile memory 14 (STEP S2; YES), control section 11 reads job setting information from nonvolatile memory 14, and expands it into RAM 13 (STEP S3). And this processing is ended. Control section 11 will execute the job after this based on job setting information expanded to RAM 13. This processing will be described in FIG. 9, which will be described later.

Next, with reference to FIG. 4, memory processing of the first job setting information will be described. Processing shown in FIG. 4 is processing after events for interruption, such as empty of paper and a paper jam (jam), arise during execution of a job until job setting information is memorized in nonvolatile memory 14.

Control section 11 will interrupt the job under execution, when events for interruption, such as jam, are detected during execution of the job (STEP S11). And control section 11 turns off a sub-power supply (STEP S12).

Control section 11 determines about whether nonvolatile memory 14 is made to memorize job setting information before main power supply is tuned off, after turning off the sub-power supply (STEP S13). Here, control section 11 displays a directions input screen on operation display section 4, which displays the screen by which a user is able to select whether or not job setting information is memorized.

Figure 5:
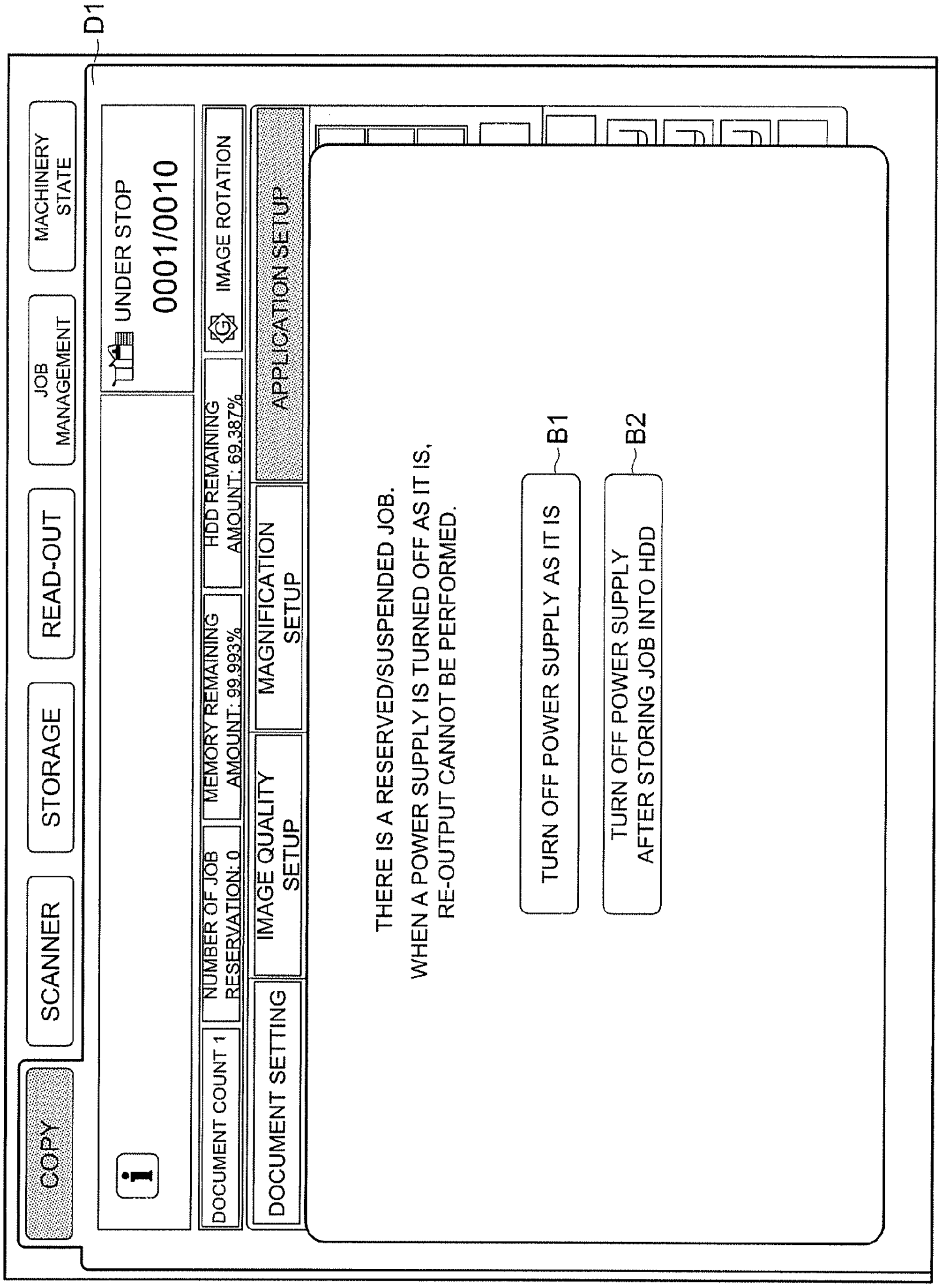
FIG. 5 illustrates a drawing showing an example of a directions input screen.

FIG. 5 illustrates directions input screen D1 by which a user can select whether job setting information would be memorized. Displayed are two buttons including Button B1 "To turn off a power supply as it is", and button B2 "To turn off power supply after storing a job into HDD".

When the user pushes button B1 displayed "To turn off a power supply as it is", control section 11 will set power supply to each section to off, without allowing nonvolatile memory 14 to memorize job setting information on an interrupted job.

When the user pushes button B2 displayed "To turn off power supply after storing a job into HDD", control section 11 will set power supply to each section to off, after allowing nonvolatile memory 14 to memorize job setting information on an interrupted job.

When either button B1 or B2 is pushed by the user, control section 11 follows directions information generated here and performs following processes.

In the case where button B1 "To turn off a power supply as it is" is pushed and that directions information is received (STEP S13; NO), control section 11 turns off the main power supply of image forming apparatus 100 (STEP S18), and ends this processing.

On the other hand, control section 11 determines whether an interrupted job has been completed, in the case where "To turn off power supply after storing a job into HDD" button B2 is pushed and the directions information is received (STEP S13; YES) (STEP S14).

In the case where an interrupted job is completed, this is, when one job is completed, a case where events for interruption arose and there is no job of waiting for execution in others, (STEP S14; NO), control section 11 allows electric power switch 7 to turn off the main power supply (STEP S18), and ends this processing.

On the other hand, in the case where an interrupted job has not been completed (STEP S14; YES), control section 11 determines whether setting information on synthetic image data is included in the job setting information on the interrupted job (STEP S15). A setting screen hereafter displayed when setting up synthetic image data will be described with reference to FIGS. 6-8.

Figure 6:
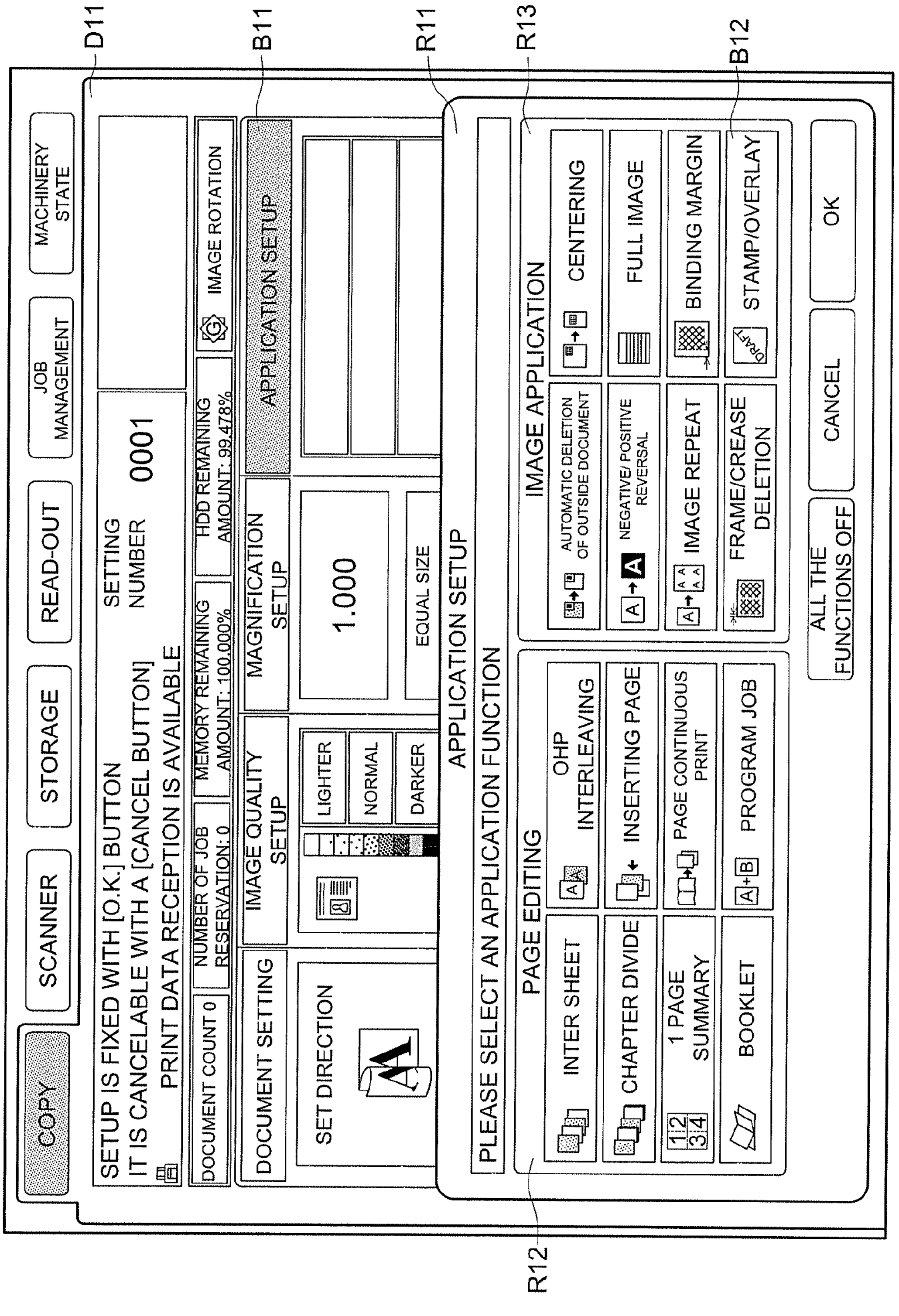
FIG. 6 illustrates a drawing showing an example of a setting screen.
Figure 7:
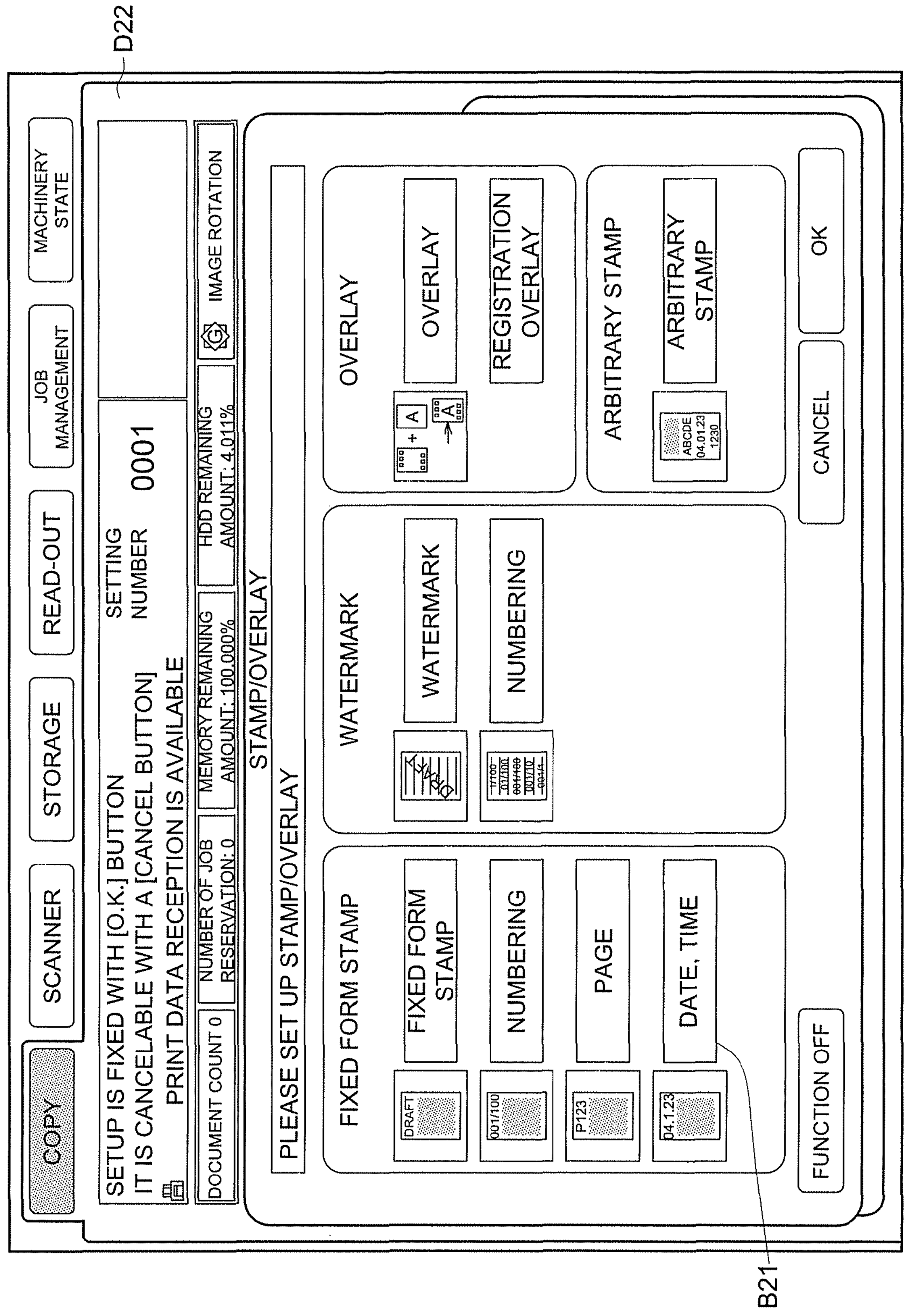
FIG. 7 illustrates a drawing showing an example of a setting screen.
Figure 8:
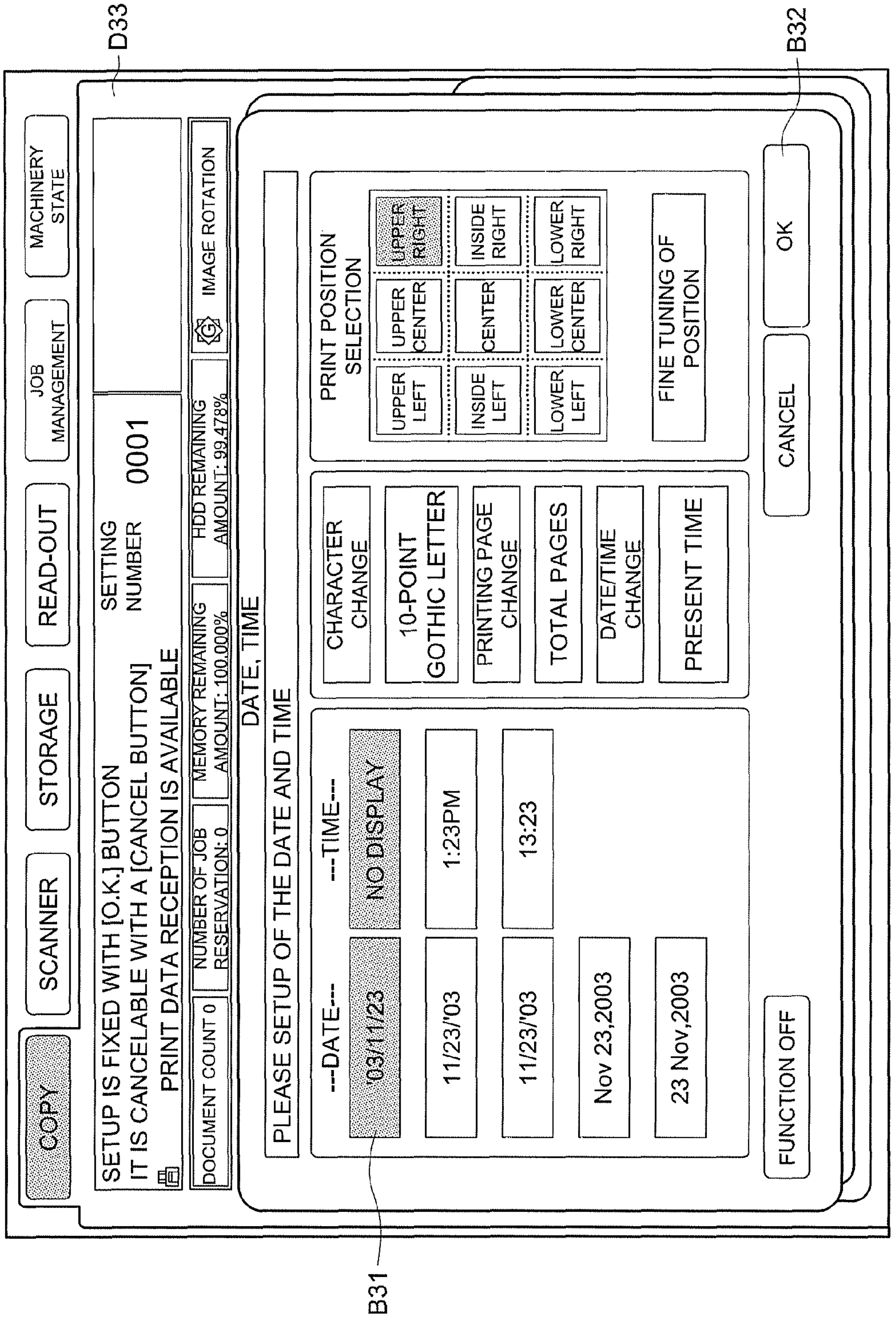
FIG. 8 illustrates a drawing showing an example of a setting screen.

Setting screens D11-D33 displayed in the case of a setup of synthetic image data are shown in FIGS. 6-8. The setting screen shown below is displayed on operation display section 4.

FIG. 6 illustrates setting screen D11. Setting screen D11 is a setting screen displayed in the case where application setting button B11 on a basic screen (not shown) is pushed by a user. Application setting area R11 is overlapped on the basic screen, and is displayed on setting screen D11.

Page edit area R12 and image application area R13 are displayed on application setting area R11. After performing image formation to page edit area R12, the contents of post-processing performed against the sheet are displayed on a button. The contents of post-processing performed on image application area R13 against image data are displayed on the button. By pushing the button in which the contents of post-processing are displayed, the user can select the contents of further more detailed post-processing.

When "stamp/overlay" button B12 is pushed by the user, control section 11 will be changed to setting screen D22 and will be displayed by operation display section 4.

FIG. 7 illustrates setting screen D22. Types and embodiments of the stamp image, which are synthesized to the image data are displayed on setting screen D22 so as to be selectable.

When "date and time" button B21 is pushed by user among the types and embodiments of the stamp image displayed on setting screen D22, control section 11 will be changed to setting screen D33 by operation display section 4 and will be displayed.

FIG. 8 illustrates setting screen D33. Types, display modes and a display position of the time stamp data in synthetic image data are displayed on setting screen D33 so as to be selectable. After these of type selection button B31 are selected by the user, when the O.K. button B32 is pushed, setting information on synthetic image data will be determined. Determined setting information will be included in the job setting information by control section 11.

Returning to FIG. 4, in the case where setting information on synthetic image data is not included in job setting information on the job which was interrupted (STEP S15; NO), control section 11 allows nonvolatile memory 14 to memorize job setting information on the uncompleted job (STEP S17).

On the other hand, in the case where setting information on synthetic image data is included in the job setting information on the interrupted job (STEP S15; YES), control section 11 allows nonvolatile memory 14 to memorize the present time stamp data (STEP S16). The present time stamp data to be memorized here will be read from generation section 11*a* by control section 11, and will be memorized in nonvolatile memory 14. The "present" means time at the time of interruption of the job.

Control section 11 allows nonvolatile memory 14 to memorize job setting information of the interrupted job, after allowing nonvolatile memory 14 to memorize time stamp data (STEP S16) (STEP S17). And control section 11 allows electric power switch 7 to turn off the main power supply of image forming apparatus 100 (STEP S18), and ends this processing.

Figure 9:
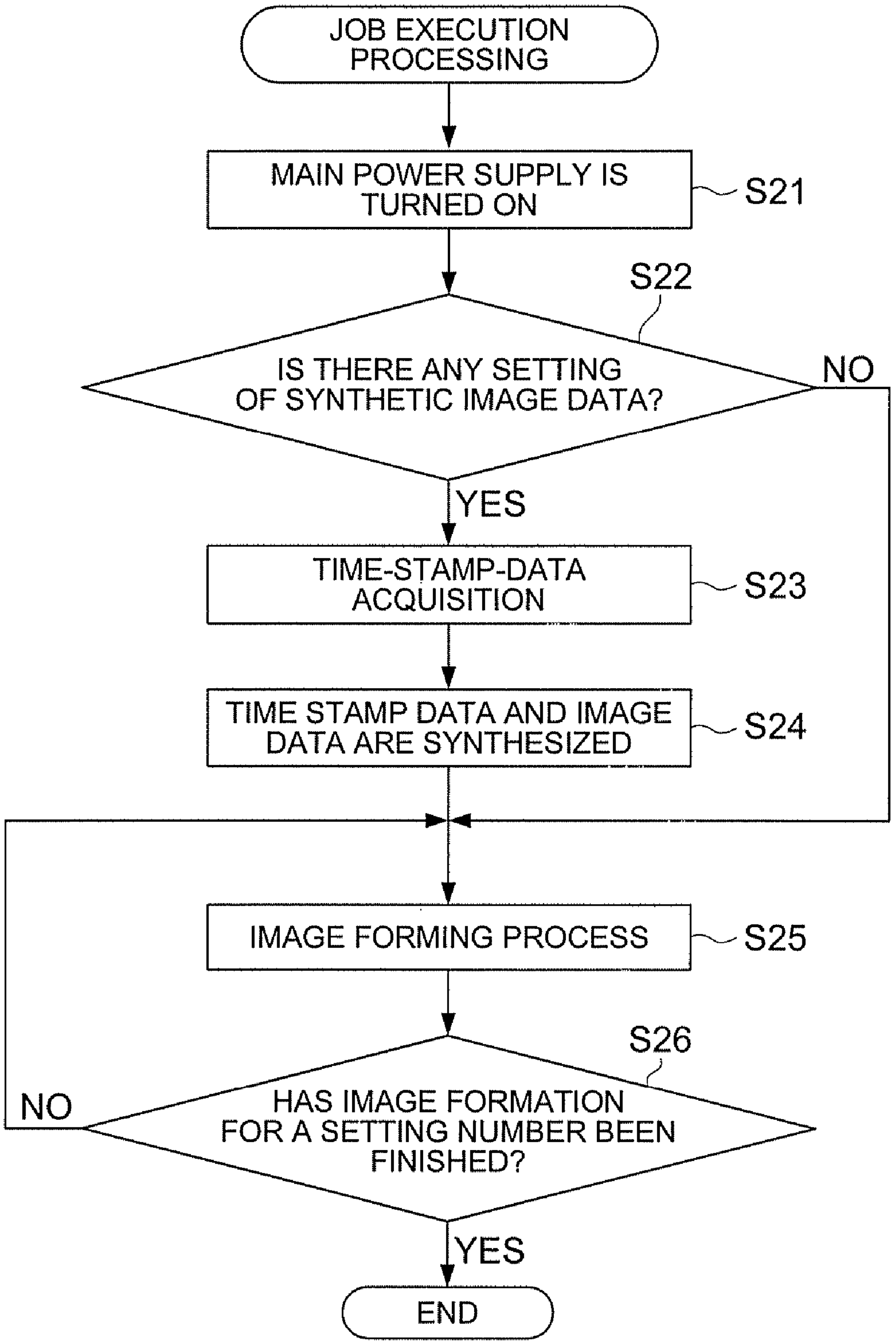
FIG. 9 illustrates a flow chart explaining job execution processing.

Next, job execution processing will be described with reference to FIG. 9. Control section 11 is supposed to allow nonvolatile memory 14 to be memorizing job setting information of an uncompleted job at the time of main power supply off of image forming apparatus 100 as a premise of processing of explaining below. In the case where setting information of synthetic image data is included in job setting information, nonvolatile memory 14 is also memorizing time stamp data (refer to FIG. 4; STEPs S16 and S17).

When the main power supply of image forming apparatus 100 is turned on, control section 11 detects main power supply on, and allows each section of image forming apparatus 100 to supply power (STEP S21). And control section 11 reads job setting information memorized in nonvolatile memory 14, and expands it to RAM 13.

Control section 11 determines whether setting information in the synthetic image data is included in job setting information expanded to RAM 13 (STEP S22). That is, in setting screen D33 shown in FIG. 8, it is determined whether the setup of synthetic image data was conducted by the user.

In the case where setting information in the synthetic image data is not included in job setting information (STEP S22; NO), control section 11 executes image forming process of image data based on this job setting information (STEP S25).

In the case where setting information in the synthetic image data is included in job setting information (STEP S22; YES), control section 11 reads the time stamp data from nonvolatile memory 14, and expands them to RAM 13 (STEP S23).

Figure 10:
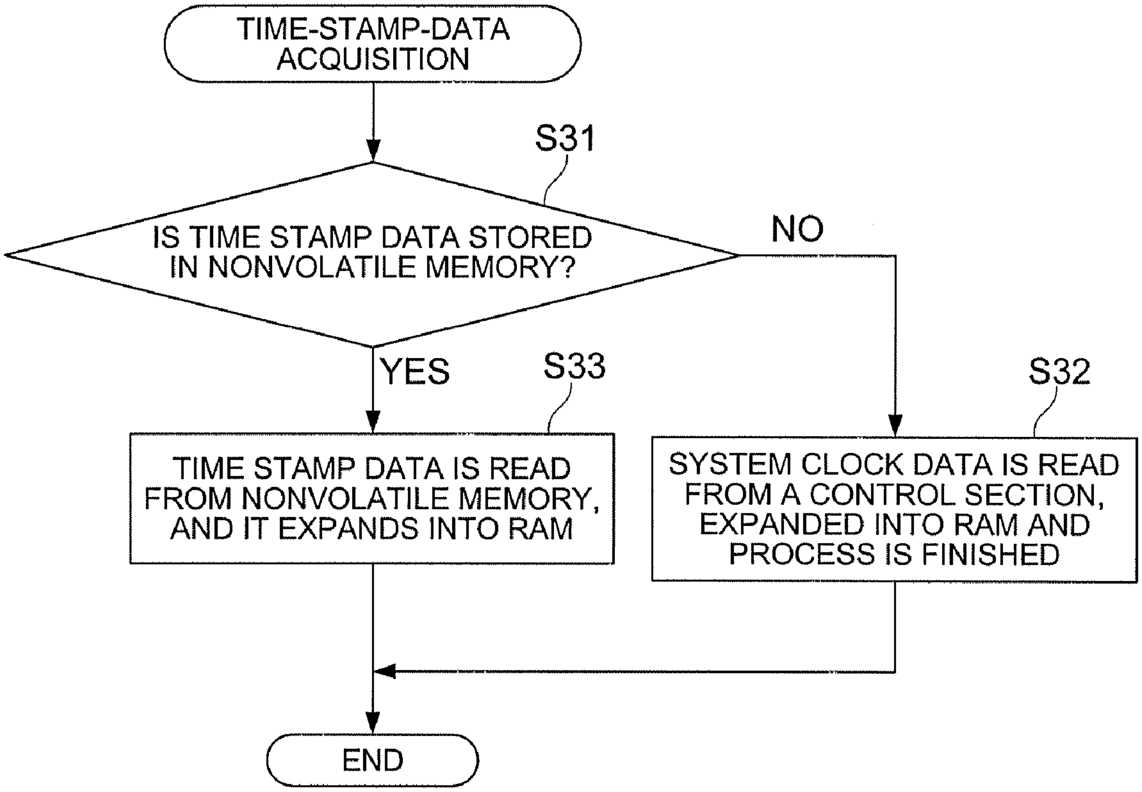
FIG. 10 illustrates a flow chart explaining time-stamp-data acquisition processing.

Here, acquisition processing of the time stamp data will be described with reference to FIG. 10. Control section 11 determines whether the time stamp data is memorized in nonvolatile memory 14 (STEP S31).

In the case where the time stamp data is not memorized in nonvolatile memory 14 (STEP S31; NO), control section 11 reads the system clock data from generation section 11*a*, and expands it to RAM 13 (STEP S32). That is, the time information which system clock data shows will be synthesized by image data as time stamp data (refer to FIG. 9; STEP S24). Processing here is the case where it is usual in which a job is not interrupted, and in the case where the setting information of the synthetic image data is included in the job setting information, the processing is performed.

On the other hand, in the case where the time stamp data is memorized in nonvolatile memory 14 (STEP S31; YES), control section 11 reads the time stamp data, and expands them to RAM 13 (STEP S33). The time and day, which the time stamp data memorized in nonvolatile memory 14 shows here is the time and day at the time of a job being interrupted, which is different from the time after restoration.

As mentioned above, from ROM12 or nonvolatile memory 14, control section 11 reads system clock data or time stamp data, and ends this processing by expanding them to RAM 13 (STEP S32, S33).

Returning to FIG. 9, control section 11 generates synthetic image data using time stamp data expanded to RAM 13 (STEP S24).

Control section 11 executes the image forming process of generated synthetic image data (STEP S25). Feed processing, image forming process and sheet ejection processing are included in the image forming process here.

Control section 11 determines whether the image forming process of the setting number has been completed, after executing image forming process of synthetic image data (STEP S26). Information of the setting number is included in the job setting information. Therefore, control section 11 is able to determine whether the image formation of the setting number has been carried out based on the job setting information.

In the case where the image forming process for the setting number has not been completed (STEP S26; NO), control section 11 shifts processing to STEP S25, and executes image forming process again for the different image data or synthetic image data (STEP S25).

On the other hand, in the case where the image forming process for the setting number is completed (STEP S26; YES), control section 11 ends this processing. By passing through processing of the above FIGS. 3-4 and 9, the sheet image to be ejected will be described below.

Figure 11:
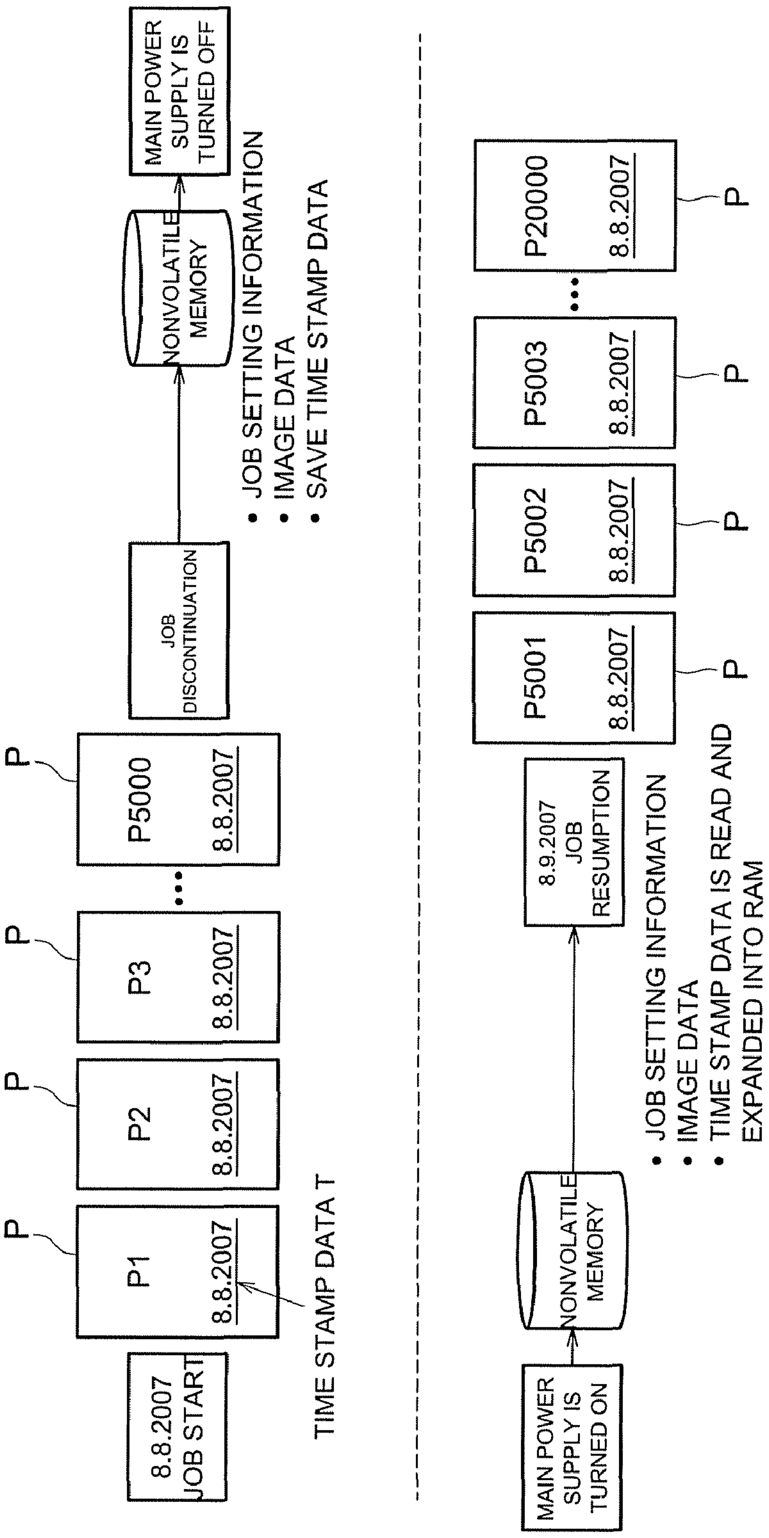
FIG. 11 illustrates a drawing explaining an example of a sheet ejection image.

The sheet image when the job under execution is interrupted and resumed is shown in FIG. 11. "P1"-"P20000" currently displayed on sheet P shows the number of pages of sheets P to which have been ejected. "2007. 8.8" shows time stamp data T when the image formation was performed to sheet P.

First, the upper row will be described. The job was started on Aug 8, 2007, and a job was interrupted after executing the 5000th page. Therefore, as shown in FIG. 11, image formation of the time stamp data T in which the date at the time of job execution is shown is performed to the sheet from the first page to the 5000th page.

When the job is interrupted, job setting information, image data of the job and time stamp data T are memorized in nonvolatile memory 14. Time stamp data T memorized here shows time at the time of interruption. That is, it is on Aug 8, 2007.

And after described job setting information is memorized in nonvolatile memory 14, and the main power is turned off.

Next, the lower berth will be described. The job is resumed on Aug 9, 2007 to which one day has passed after being interrupted. And sheet is ejected even to the 20000th page from the 5001st page. Here, image formation of the time stamp data T memorized in advance to nonvolatile memory 14 is performed to sheet P to be ejected. That is, image formation of the time stamp data T which is "Aug 8, 2007" which is the time at the time of job interruption is shown is performed.

In FIG. 11, the case where a job was interrupted and after one day the job resumed has been described as an example, however it is not limited to this. For example, resumption of the job may be acceptable even after the elapse of two days or five days from the interruption. Image formation of the time stamp data in which "Aug 8, 2007" which is the time at the time of job interruption is shown will be performed to the sheet to be ejected by the resumed job.

As mentioned above, according to a first embodiment, before the electric power switch is turned off, the time stamp data is memorized in nonvolatile memory 14. The memorized time stamp data is the time stamp data, which were to be synthesized into image data of the interrupted(discontinued) job, and indicates the time and day at the time of interruption. Therefore, when resuming an interrupted job, the memorized time stamp data, which shows the time and date of interruption can be read from the nonvolatile memory 14, and it can be synthesized into image data.

Thereby, all time and day synthesized into image data of one job can become the same and can promote improvement in printing efficiency, and occurrence of printing sheet loss can be prevented. And, it is the case where the job which had been suspended ranging over the different day from the time and day of interruption may be executed, time stamp data in which the same time is shown can be synthesized to image data of one job.

Time stamp data is memorized to nonvolatile memory 14 at the time of main power of image forming apparatus 100 is turned off. Thereby, the user can easily grasp about time at the time of time stamp data synthesized after restoration and understand when it was occurred. The difference between actual time when the job is executed after restoration and the time which time stamp data shows can be made as small as possible.

A Second Embodiment

Hereafter, the optimum structure and operation of image forming apparatus in a second embodiment will be described in detail using drawings. In a second embodiment, image data of a job is synthesized with the time stamp data at the time of job interruption, synthetic image data is generated and an example which allows nonvolatile memory to memorize this will be described.

The image forming apparatus related to a second embodiment is the same the structure of image forming apparatus 100 or the main body section 10 of a first embodiment, and only a part of operations is different. Therefore, about image forming apparatus related to a second embodiment, the same symbols as image forming apparatus 100 related to first embodiment will be attached, detailed explanation about structure will be omitted and only a different portion of operation will be described.

Figure 12:
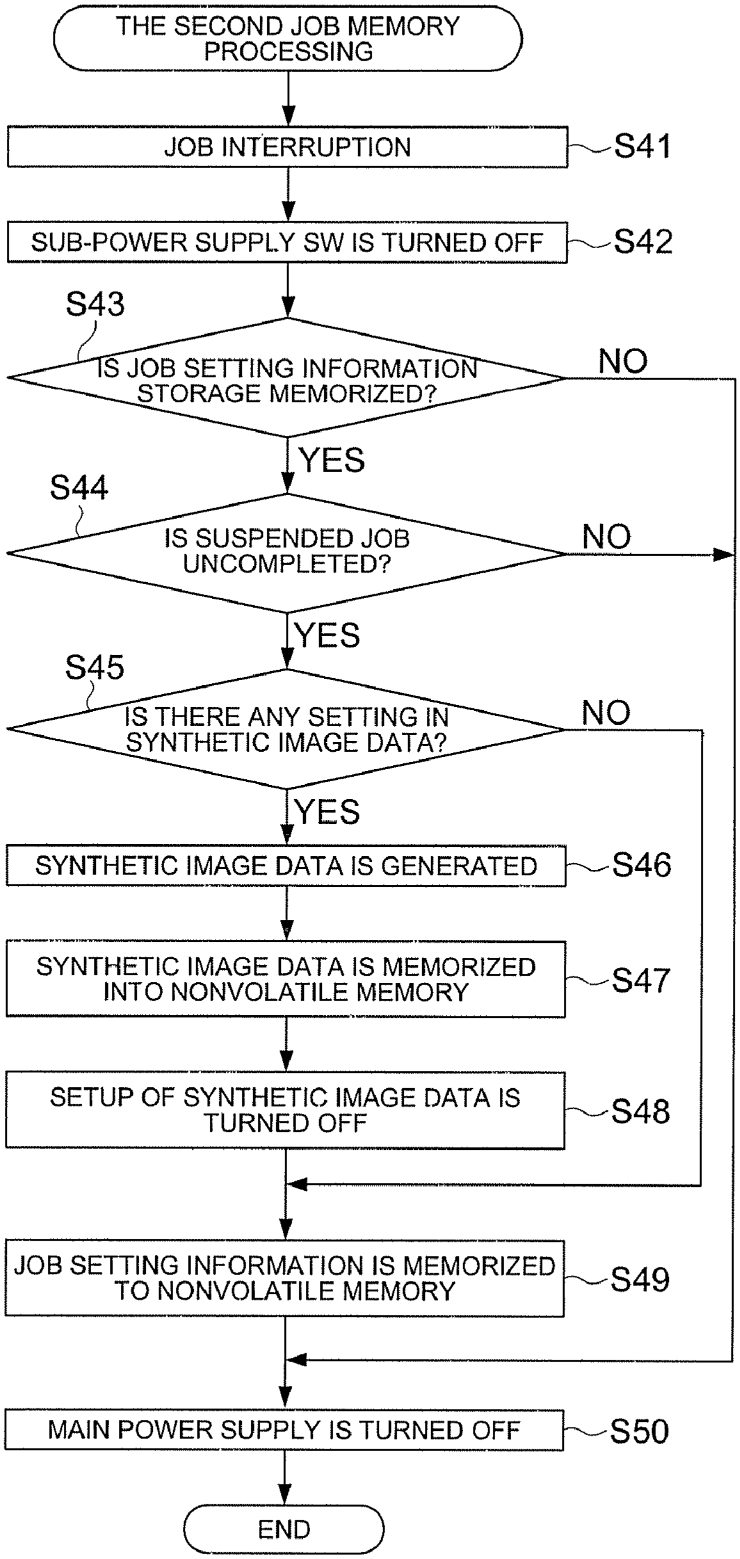
FIG. 12 illustrates a flow chart explaining job memory processing of a second.

A second job memory processing will be described with reference to FIG. 12. Processing shown in FIG. 12 is processing after events for interruption, such as a empty of paper and a paper jam (jam) arise during execution of a job until job setting information is memorized in nonvolatile memory 14.

Since processing of STEPs S41-S45, which control section 11 performs, is the same as that of STEPs S11-S15 of FIG. 4, processing after STEP S45 will be described below.

In the case where setting information on synthetic image data is not included in the job setting information on a suspended job (STEP S45; NO), control section 11 allows nonvolatile memory 14 to memorize the job setting information on the uncompleted job (STEP S49).

On the other hand, in the case where setting information of the synthetic image data is included in the job setting information of the suspended job (STEP S45; YES), control section 11 synthesizes present the time stamp data and image data, and generates synthetic image data (STEP S46).

Control section 11 allows nonvolatile memory 14 to memorize the generated synthetic image data as image data of the job (STEP S47). And control section 11 turns off the setting of the synthetic image data contained in job setting information (STEP S48). Control section 11 will perform image formation of the synthetic image data as the image data of the job by processing of STEPs S47 and S48 based on the job setting information after job restoration.

Control section 11 allows nonvolatile memory 14 to memorize the job setting information that has been passed through processing of STEP S48 (STEP S49).

And control section 11 allows electric power switch 7 to turn off the main power of image forming apparatus 100 (STEP S50), and ends this processing.

After allowing nonvolatile memory 14 to memorize the job setting information in processing of FIG. 12, in the case where the main power supply is set to off, control section 11 performs image formation of the image data after restoration based on job setting information. Here, in the case where the setting information on the synthetic image data is included in the job setting information before interruption, after restoration, image formation of the synthetic image data will be performed as image data of a job.

The sheet ejection image by which a suspended job is resumed by above-mentioned processing and paper is ejected is the same as the sheet ejection image shown in FIG. 11. However, it differs in that synthetic image data is memorized in nonvolatile memory 14 instead of time stamp data at the time of interruption.

As mentioned above, according to a second embodiment, before the main electric power switch is turned off, the synthetic image data that synthesized the time stamp data to all image data of one job is generated, and the synthetic image data is memorized in nonvolatile memory 14 as image data of the job. And when resuming an interrupted job, Synthetic image data can be read from the nonvolatile memory and it can be executing the job with the read synthetic image data. Thereby, all time and day synthesized into image data of one job can become the same and can promote improvement in printing efficiency, and occurrence of printing sheet loss can be prevented. And it is the case where the job which had suspended ranging over a different day from the time of interruption may be executed, it is possible to synthesize the time stamp data in which the same time is shown on image data of one job.

Time stamp data is synthesized into the image data at the time when the main power of image forming apparatus 100 is turned off, and image formation is performed after restoring this. Thereby, the user can easily grasp about time at the time of time stamp data synthesized after restoration and understand when it was occurred. The difference between actual time when the job is executed after restoration and the time which the time stamp data shows can be made as small as possible.

What is claimed is:

1. An image forming apparatus comprising:

a generation section which generates time stamp data, an image forming section which forms an image on a sheet based on a synthetic image data which is synthesized of the time stamp data generated by the generation section and an image data of a job, a nonvolatile memory, an electric power switch for turning on and off a power supply, a control section which controls execution of the job of the image forming section and reads out a time stamp of a time of execution of the job from the generation section as time stamp data which is to be synthesized with the image data of the job, wherein, in a case where the control section detects that the electric power switch is turned off while executing the job, the control section interrupts the execution of the job, memorizes the interrupted job including interrupted image data and the time stamp data which were to be synthesized with the interrupted image data in the nonvolatile memory, and turns off the power supply.

2. The image forming apparatus of claim 1, wherein, in a case where the control section detects that the electric power switch is turned on after the power supply is turned off, the control section turns on the power supply, synthesizes the interrupted image data and the time stamp data which were to be synthesized to the image data being memorized in the nonvolatile memory, and resumes forming of the image relating to the interrupted job.

3. An image forming apparatus comprising:

a generation section which generates time stamp data, an image forming section which forms an image on a sheet based on a synthetic image data which is synthesized of the time stamp data generated by the generation section and an image data of a job, a nonvolatile memory, an electric power switch for turning on and off a power supply, a control section which controls execution of the job of the image forming section and reads out a time stamp of a time of execution of the job from the generation section as time stamp data which is to be synthesized with the image data of the job, wherein, in a case where the control section detects that the electric power switch is turned off while executing the job, the control section interrupts the execution of the job, synthesizes the synthetic image data from interrupted image data and present time stamp data, forms interrupted job of which the interrupted image data is changed to the synthetic image data, memorizes the interrupted job including the synthetic image data to the nonvolatile memory, and turns off the power supply.

4. The image forming apparatus of claim 3, wherein, in a case where the control section detects that the electric power switch is turned on after the power supply is turned off, the control section turns on the power supply, and resumes forming of the image relating to the interrupted job having been memorized in the nonvolatile memory.

* * * * *